(12) United States Patent
Graham et al.

(10) Patent No.: US 9,733,664 B1
(45) Date of Patent: Aug. 15, 2017

(54) METHOD FOR EXPIRING FAULT-TOLERANT TIMERS USING DISTRIBUTED LOCKS

(71) Applicant: Gamesys Ltd., London (GB)

(72) Inventors: Phillip Jarlath Graham, London (GB); Joshua Richard Watkins, London (GB)

(73) Assignee: Gamesys Ltd., London (GB)

( * ) Notice: Subject to any disclaimer, the term of this patent is extended or adjusted under 35 U.S.C. 154(b) by 574 days.

(21) Appl. No.: 14/086,072

(22) Filed: Nov. 21, 2013

(51) Int. Cl.
| | |
|---|---|
| *G06F 15/16* | (2006.01) |
| *G06F 15/173* | (2006.01) |
| *G06F 1/10* | (2006.01) |
| *H04L 1/18* | (2006.01) |
| *H04L 29/08* | (2006.01) |
| *H04L 29/06* | (2006.01) |
| *G06F 1/14* | (2006.01) |

(52) U.S. Cl.
CPC .......... *G06F 1/10* (2013.01); *G06F 1/14* (2013.01); *H04L 1/1848* (2013.01); *H04L 1/1851* (2013.01); *H04L 63/10* (2013.01); *H04L 67/1063* (2013.01); *H04L 67/1068* (2013.01); *H04L 67/34* (2013.01); *H04L 67/104* (2013.01)

(58) Field of Classification Search
CPC .......... H04L 1/1848; H04L 1/1851; H04L 29/12113; H04L 61/1541; H04L 63/10; H04L 67/104; H04L 67/34; H04L 67/1063; H04L 67/1061; H04L 67/1068; G06F 4/526; G06F 1/14

USPC .................................................. 709/201, 223
See application file for complete search history.

(56) References Cited

U.S. PATENT DOCUMENTS

| | | | | |
|---|---|---|---|---|
| 5,131,084 | A * | 7/1992 | Kasashima | G06F 9/52 713/375 |
| 5,596,754 | A * | 1/1997 | Lomet | G06F 9/526 707/E17.007 |
| 5,659,720 | A * | 8/1997 | Fiacco | G06F 1/14 713/502 |
| 5,908,470 | A * | 6/1999 | Stonecypher, Jr. | G06F 9/52 713/502 |
| 6,163,506 | A * | 12/2000 | Mundy | G06F 9/4825 368/10 |
| 6,279,034 | B1 * | 8/2001 | Jarriel | G06F 1/14 709/223 |
| 6,389,420 | B1 * | 5/2002 | Vahalia | G06F 17/30171 |
| 6,493,746 | B1 * | 12/2002 | Enjou | H04L 41/0233 707/999.008 |
| 6,574,654 | B1 * | 6/2003 | Simmons | G06F 9/524 707/999.008 |
| 6,618,744 | B1 * | 9/2003 | Simmons | G06F 9/524 707/999.01 |
| 6,668,270 | B1 * | 12/2003 | Simmons | G06F 9/524 707/999.008 |
| 6,668,295 | B1 * | 12/2003 | Chan | G06F 9/52 707/999.008 |
| 6,704,767 | B1 * | 3/2004 | Simmons | G06F 9/526 707/999.008 |

(Continued)

*Primary Examiner* — Daniel C Murray
(74) *Attorney, Agent, or Firm* — Fincham Downs, LLC; Carson C. K. Fincham

(57) ABSTRACT

Systems, methods, and articles of manufacture provide for fault-tolerant timers, such as in an online gaming environment. Fault-tolerant timers may, for example, be provided by implementing specific methods for expiring a timer, such as by utilizing broadcast notices and distributed locks.

6 Claims, 12 Drawing Sheets

(56) References Cited

U.S. PATENT DOCUMENTS

| | | | | |
|---|---|---|---|---|
| 6,708,198 B1* | 3/2004 | Simmons | G06F 9/524 | 707/999.008 |
| 6,715,146 B1* | 3/2004 | Simmons | G06F 9/524 | 707/999.008 |
| 6,826,761 B1* | 11/2004 | Damon | G06F 1/14 | 713/502 |
| 6,915,522 B2* | 7/2005 | Arajs | G06F 9/526 | 707/999.008 |
| 7,028,300 B2* | 4/2006 | Goldick | G06F 9/52 | 707/999.001 |
| 7,073,176 B1* | 7/2006 | Simmons | G06F 9/524 | 707/999.008 |
| 7,080,075 B1* | 7/2006 | Chan | G06F 17/30362 | |
| 7,150,019 B1* | 12/2006 | Simmons | G06F 9/524 | 709/208 |
| 7,206,841 B2* | 4/2007 | Traversat | G06F 9/4416 | 709/203 |
| 7,350,117 B2* | 3/2008 | Garcia | G06F 9/526 | 714/55 |
| 7,406,519 B2* | 7/2008 | Goldick | G06F 9/526 | 707/E17.007 |
| 7,484,225 B2* | 1/2009 | Hugly | G06F 9/465 | 709/203 |
| 7,487,509 B2* | 2/2009 | Hugly | G06F 9/54 | 709/230 |
| 7,533,161 B2* | 5/2009 | Hugly | H04L 63/02 | 709/220 |
| 7,533,172 B2* | 5/2009 | Traversat | G06F 9/4416 | 709/223 |
| 7,747,763 B2* | 6/2010 | Backman | H04L 41/5035 | 709/225 |
| 7,921,089 B2* | 4/2011 | Kailash | H04L 63/10 | 707/662 |
| 7,941,688 B2* | 5/2011 | Sharma | G06F 9/45533 | 713/502 |
| 7,984,183 B2* | 7/2011 | Andersen | G06F 9/5083 | 709/238 |
| 8,151,278 B1* | 4/2012 | Knee | H04L 69/28 | 709/241 |
| 8,239,871 B2* | 8/2012 | Ogasawara | G06F 9/4825 | 714/38.12 |
| 8,307,030 B1* | 11/2012 | Hu | H04L 43/022 | 370/389 |
| 8,352,658 B2* | 1/2013 | Tarta | G06F 9/526 | 710/200 |
| 8,463,911 B2* | 6/2013 | Sasaoka | G06F 9/526 | 709/226 |
| 8,495,266 B2* | 7/2013 | Reuter | G06F 9/526 | 709/248 |
| 8,868,748 B2* | 10/2014 | Attaluri | G06F 9/526 | 709/226 |
| 8,868,755 B2* | 10/2014 | Attaluri | G06F 9/526 | 709/226 |
| 2002/0143944 A1* | 10/2002 | Traversat | G06F 9/4416 | 709/225 |
| 2002/0184357 A1* | 12/2002 | Traversat | G06F 9/4416 | 709/223 |
| 2003/0093524 A1* | 5/2003 | Goldick | G06F 9/526 | 709/225 |
| 2003/0105871 A1* | 6/2003 | Goldick | G06F 9/526 | 709/229 |
| 2004/0030743 A1* | 2/2004 | Hugly | G06F 9/465 | 709/203 |
| 2004/0030794 A1* | 2/2004 | Hugly | H04L 63/02 | 709/230 |
| 2004/0088413 A1* | 5/2004 | Bhogi | G06F 9/5061 | 709/226 |
| 2006/0075061 A1* | 4/2006 | Garcia | G06F 9/526 | 709/213 |
| 2006/0129556 A1* | 6/2006 | Reuter | G06F 9/526 | |
| 2007/0027970 A1* | 2/2007 | Backman | H04L 41/5035 | 709/223 |
| 2007/0282966 A1* | 12/2007 | Walker | G06F 9/466 | 709/213 |
| 2008/0013450 A1* | 1/2008 | Worley | G06F 17/30551 | 370/230 |
| 2009/0259870 A1* | 10/2009 | Sharma | G06F 9/45533 | 713/400 |
| 2009/0320030 A1* | 12/2009 | Ogasawara | G06F 9/4825 | 718/102 |
| 2011/0137879 A1* | 6/2011 | Dubey | G06F 17/30171 | 707/704 |
| 2011/0296028 A1* | 12/2011 | Sasaoka | G06F 9/526 | 709/226 |
| 2011/0296069 A1* | 12/2011 | Tarta | G06F 9/526 | 710/200 |
| 2012/0089735 A1* | 4/2012 | Attaluri | G06F 9/526 | 709/226 |
| 2013/0336435 A1* | 12/2013 | Akkihal | H04J 3/0647 | 375/356 |
| 2014/0032765 A1* | 1/2014 | Attaluri | G06F 9/526 | 709/226 |
| 2014/0092773 A1* | 4/2014 | Xun | H04L 12/42 | 370/254 |
| 2015/0019739 A1* | 1/2015 | Attaluri | G06F 9/526 | 709/226 |

* cited by examiner

METHOD FOR EXPIRING FAULT-TOLERANT TIMERS USING DISTRIBUTED LOCKS

CROSS-REFERENCE TO RELATED APPLICATIONS

The present application is a non-provisional of and claims the benefit of priority to U.S. Provisional Patent Application Ser. No. 61/785,659, filed Mar. 14, 2013 in the name of Graham et al. and entitled SYSTEMS AND METHODS FOR FAULT-TOLERANT TIMERS. The entirety of such application is hereby incorporated by reference herein for all purposes.

FIELD OF THE INVENTION

At least some embodiments described herein relate to timers for distributed computing systems, and particularly to methods and systems for fault tolerant timers for such systems.

BACKGROUND

To insure that online games are fair to all players, especially where there is wagering, it is desirable to insure that the system that provides the game has timers (e.g., the amount of time a player has to take a turn) that are reliable, consistent, and are not affected by the number of players. Thus, what is needed are scalable, fault-tolerant timers.

DETAILED DESCRIPTION OF EXAMPLE EMBODIMENTS

Figure 1:
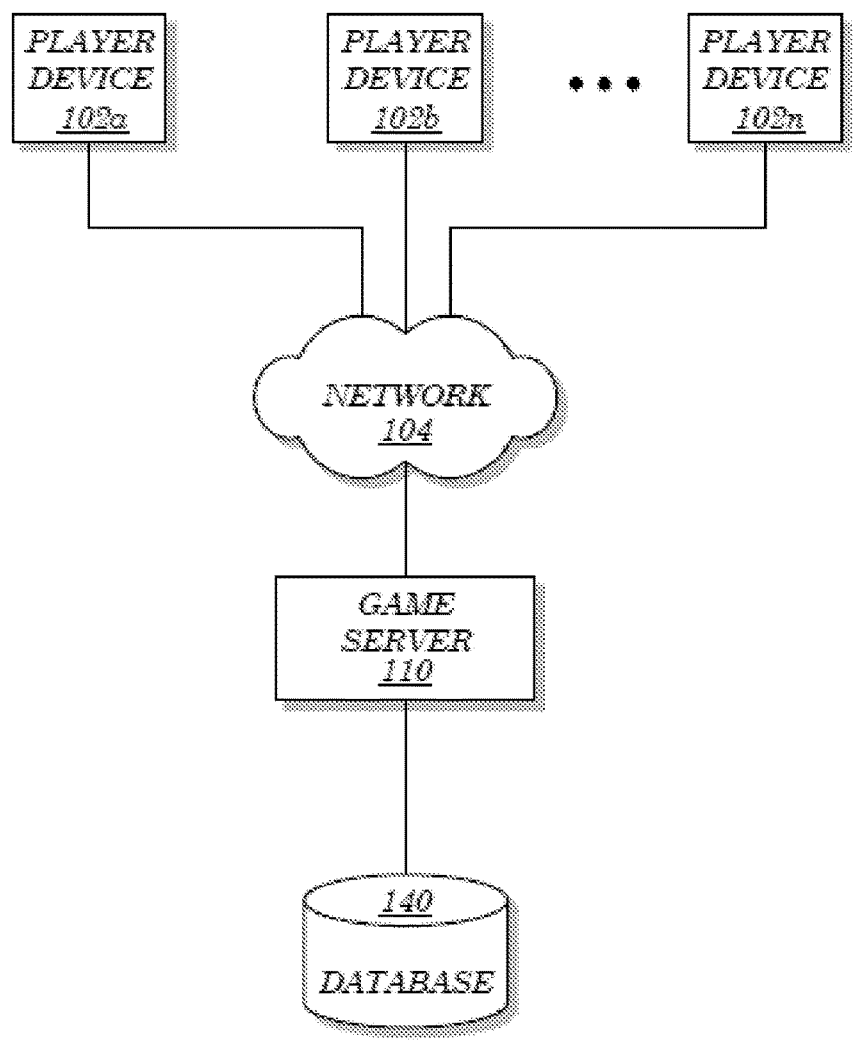
FIG. 1 is a schematic diagram of an embodiment of a distributed computing system in accordance with one or more embodiments described herein.

Embodiments presented herein are descriptive of systems, apparatus, methods, and articles of manufacture for fault-tolerant timers. Distributed computing systems may use any number of timers for various aspects of the applications being executed on the system. For example, in many massively multiplayer online (MMO) games, such as poker, a player can be given a limited time window within which they are allowed to act. For example, in a poker game, a player may be given thirty seconds to bet (e.g., raise) and the system will default to assuming the player wants to pass if the player does not make the bet (e.g., activate a graphical user interface (GUI) control) within the thirty second time window. Thus, when the system allows the player to bet, (e.g., at the start of the thirty second betting window), the system sets a thirty second timer associated with the player and his turn to bet. On large MMO poker sites the use of such timers can result in an exceptionally large number (e.g., approximately twenty thousand (~20k)) of requests per second system wide to create new time windows or remove them after a player has acted.

Although it is feasible to build a solution to cope with this amount of computing load, the challenge can be significantly more difficult if the system is also designed to have no single point of failure and also to be elastically scalable while running (e.g., executing on one or more processors and/or servers). In other words, if the system is fault tolerant to avoid the possibility of a single point of failure, for example, by using multiple timer nodes to set and track timers, the computing load can increase dramatically. Likewise, dynamically obtaining and releasing processing power as needed (in order to be elastically scalable) can significantly increase the processing to track and maintain the timer nodes. Conventional implementations do not solve these problems. For example, when using a distributed hash table (e.g., Hazelcast/Riak) issues arise with properly distributing the work of expiring timeouts while also preserving fault tolerance. Even if a database designed to be scalable (e.g., MongoDB™) is used, significant work is required by such systems to distribute the load of expiring the timeouts efficiently. Further, in such a database, all storage and removing of timeouts are processed through a single node and such systems use dedicated replica nodes which increase the number of timing instances required. Thus, the present invention provides an improved system that addresses each of these issues.

A timing system in accordance with embodiments as described herein is generally a group of nodes that work together to provide a fast, fault tolerant, and scalable way to schedule, cancel, and be notified of the expiration of events (timeouts). In some embodiments, such a timing system provides no single point of failure and allows for elastic scalability when running. In some embodiments, the system nodes can store the timeouts and, in other embodiments, an external distributed timeout data store can be used.

DEFINITIONS

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. Other terms are defined throughout the present description.

A "game", as the term is used herein (unless specified otherwise), may generally comprise any game (e.g., wagering or non-wagering, electronically playable over a network) playable by one or more players in accordance with specified rules. A game may be playable on a Personal Computer (PC) online in web browsers, on a game console and/or on a mobile device such as a smart-phone or tablet computer. "Gaming" thus generally refers to play of a game.

A "casual game", as the term is used herein (unless specified otherwise), may generally comprise a game with simple rules with little or no time commitment on the time of a player to play. A casual game may feature, for example, very simple game play such as a puzzle or Scrabble™ game, may allow for short bursts of play (e.g., during work breaks), an ability to quickly reach a final stage and/or continuous play without a need to save the game. In some embodiments, a casual game can be a social network game.

A "social network game", as used herein (unless specified otherwise), generally refers to a type of online game that is played through a social network, and in some embodiments may feature multiplayer and asynchronous game play mechanics. A "social network" may refer to an online service, online community, platform, or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a browser game, but can also be implemented on other platforms such as mobile devices.

A "wagering game", as the term is used herein (unless specified otherwise), may generally comprise a game on which a player can risk a wager or other consideration, such as, but not limited to: slot games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. "Gambling" or "wagering" generally refers to play of a wagering game.

The term "game provider", as used herein (unless specified otherwise), generally refers to an entity or system of components which provides games for play and facilitates play of such game by use of a network such as the Internet or a proprietary or closed networks (e.g., an intranet or wide area network). For example, a game provider may operate a website which provides games in a digital format over the Internet. In some embodiments in which a game comprising a wagering game is provided, a game provider may operate a gambling website over which wagers are accepted and results of wagering games are provided.

As utilized herein, the term "player" may generally refer to any type, quantity, and or manner of entity associated with the play of a game. In some embodiments, a player may comprise an entity conducting play of an online game, for example, may comprise an entity that desires to play a game (e.g., an entity registered and/or scheduled to play and/or an entity having expressed interest in the play of the game—e.g., a spectator) and/or may comprise an entity that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise an individual (or group) that enters, joins, logs into, registers for, and/or otherwise access an online game room, session, server, and/or other particular instance and/or segmentation of an online game.

Some embodiments described herein are associated with a "player device" or a "network device". As used herein, a "player device" is a subset of a "network device". The "network device", for example, may generally refer to any device that can communicate via a network, while the "player device" may comprise a network device that is owned and/or operated by or otherwise associated with a player. Examples of player and/or network devices may include, but are not limited to: a Personal Computer (PC), a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

As used herein, the term "network component" may refer to a player or network device, or a component, piece, portion, or combination of player or network devices. Examples of network components may include a Static Random Access Memory (SRAM) device or module, a network processor, and a network communication path, connection, port, or cable.

In addition, some embodiments are associated with a "network" or a "communication network." As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication", as used herein (unless specified otherwise), may generally refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

A "session", as the term is used herein (unless indicated otherwise), may generally comprise a period of time spanning a plurality of event instances or turns of the game, the session having a defined start and defined end. An event instance or turn is triggered upon an initiation of, or request for, at least one result of the game by a player, such as an actuation of a "start" or "spin" mechanism, which initiation causes an outcome to be determined or generated (e.g., a random number generator is contacted or communicated with to identify, generate or determine a random number to be used to determine a result for the event instance).

As used herein, the terms "outcome" and "result" should be differentiated in the present description in that an "outcome" is generally a representation of a "result", typically comprising one or more game elements or game symbols. For example, in a "fruit themed" game, a winning outcome (i.e., an outcome corresponding to some kind of award, prize or payout) may comprise a combination of three "cherry" symbols. The "result" of this outcome may be a payout of X credits awarded to the player associated with the game. In another example, in a game in which a character moves along a game interface from a starting position to a finish position, an "outcome" of the game may comprise a symbol representing one or more movements along the interface and the "result" corresponding to this outcome may be the particular number and direction of the character's movement (e.g., three (3) spaces backwards such that the character ends up further away from the finish line). In a session embodiment, a session result may comprise a binary result (e.g., a player or game character wins or loses the session) and/or the particular award (or magnitude of award) won or earned by the player based on the session (e.g., the number of credits awarded to the player). It should be noted that the embodiments described herein encompass awards, prizes and payouts which are monetary, non-monetary, tangible or intangible.

As used herein, the term "virtual currency" may generally refer to an in-game currency that may be used as part of a game or one or more games provided by a game provider as (i) currency for making wagers, and/or (ii) to purchase or access various in-game items, features or powers.

A "credit balance", as the term is used herein (unless indicated otherwise), may generally refer to (i) a balance of currency, whether virtual currency and/or real currency, usable for making wagers in a game and/or (ii) another tracking mechanism for tracking a player's success or advancement in a game by deducting there from points or value for unsuccessful attempts at advancement and adding thereto points or value for successful attempts at advancement.

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable here. In some embodiments, one or more specialized machines such as a computerized processing device, a server, a remote terminal, and/or a customer device may implement the various practices described herein. A computer system of an gaming entity may, for example, comprise various specialized computers that interact to provide for online games as described herein.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

Systems

Turning first to FIG. 1, a block diagram of a system 100 according to some embodiments is shown. In some embodiments, the system 100 may comprise a gaming platform such as a gaming platform via which one or more multi-player and/or online games may be played. In some embodiments, the system 100 may comprise a plurality of player devices 102a-n in communication with and/or via a network 104. In some embodiments, a game server 110 may be in communication with the network 104 and/or one or more of the player devices 102a-n. In some embodiments, the game server 110 (and/or the player devices 102a-n) may be in communication with a database 140. The database 140 may store, for example, game date (e.g., processed and/or defined by the game server 110), data associated with players (not explicitly shown) owning and/or operating the player devices 102a-n, and/or instructions that cause various devices (e.g., the game server 110 and/or the player devices 102a-n) to operate in accordance with embodiments described herein.

According to some embodiments, any or all of the components 102a-n, 104, 110, 140 of the system 100 may be similar in configuration and/or functionality to any similarly named and/or numbered components described herein. Fewer or more components 102a-n, 104, 110, 140 (and/or portions thereof) and/or various configurations of the components 102a-n, 104, 110, 140 may be included in the system 100 without deviating from the scope of embodiments described herein. While multiple instances of some components 102a-n are depicted and while single instances of other components 104, 110, 140 are depicted, for example, any component 102a-n, 104, 110, 140 depicted in the system 100 may comprise a single device, a combination of devices and/or components 102a-n, 104, 110, 140, and/or a plurality of devices, as is or becomes desirable and/or practicable. Similarly, in some embodiments, one or more of the various components 102a-n, 104, 110, 140 may not be needed and/or desired in the system 100.

The player devices 102a-n, in some embodiments, may comprise any type or configuration of electronic, mobile electronic, and or other network and/or communication devices (or combinations thereof) that are or become known or practicable. A first player device 102a may, for example, comprise one or more PC devices, computer workstations (e.g., game consoles and/or gaming computers), tablet computers, such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, one or more of the player devices 102a-n may be specifically utilized and/or configured (e.g., via specially-programmed and/or stored instructions such as may define or comprise a software application) to communicate with the game server 110 (e.g., via the network 104).

The network 104 may, according to some embodiments, comprise a LAN, WAN, cellular telephone network, Bluetooth® network, NFC network, and/or RF network with communication links between the player devices 102a-n, the game server 110, and/or the database 140. In some embodiments, the network 104 may comprise direct communications links between any or all of the components 102a-n, 110, 140 of the system 100. The game server 110 may, for example, be directly interfaced or connected to the database 140 via one or more wires, cables, wireless links, and/or other network components, such network components (e.g., communication links) comprising portions of the network 104. In some embodiments, the network 104 may comprise one or many other links or network components other than those depicted in FIG. 1. A second player device 102b may, for example, be connected to the game server 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 110, 140 of the system 100. The network 104 may comprise one or more cellular telephone networks with communication links between the player devices 102a-n and the game server 110, for example, and/or may comprise the Internet, with communication links between the player devices 102a-n and the database 140, for example.

According to some embodiments, the game server 110 may comprise a device (and/or system) owned and/or operated by or on behalf of or for the benefit of a gaming entity (not explicitly shown). The gaming entity may utilize player and/or game information or instructions (e.g., stored by the database 140), in some embodiments, to host, manage, analyze, design, define, price, conduct, and/or otherwise provide (or cause to be provided) one or more games such as online multiplayer games. In some embodiments, the gaming entity (and/or a third-party; not explicitly shown) may provide an interface (not shown in FIG. 1) to and/or via the player devices 102a-n. The interface may be configured, according to some embodiments, to allow and/or facilitate electronic game play by one or more players. In some embodiments, the system 100 (and/or interface provided by the game server 110) may present game data (e.g., from the database 140) in such a manner that allows players to participate in one or more online games (singularly, in/with groups, and/or otherwise). According to some embodiments, the game server 110 may provide benefits to players based on player referrals and/or based on groups of players that play together in an online multiplayer game.

In some embodiments, the database 140 may comprise any type, configuration, and/or quantity of data storage devices that are or become known or practicable. The database 140 may, for example, comprise an array of optical and/or solid-state hard drives configured to store player and/or game data, and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the player devices 102a-n may comprise the database 140 or a portion thereof, for example, and/or the game server 110 may comprise the database 140 or a portion thereof.

Figure 2:
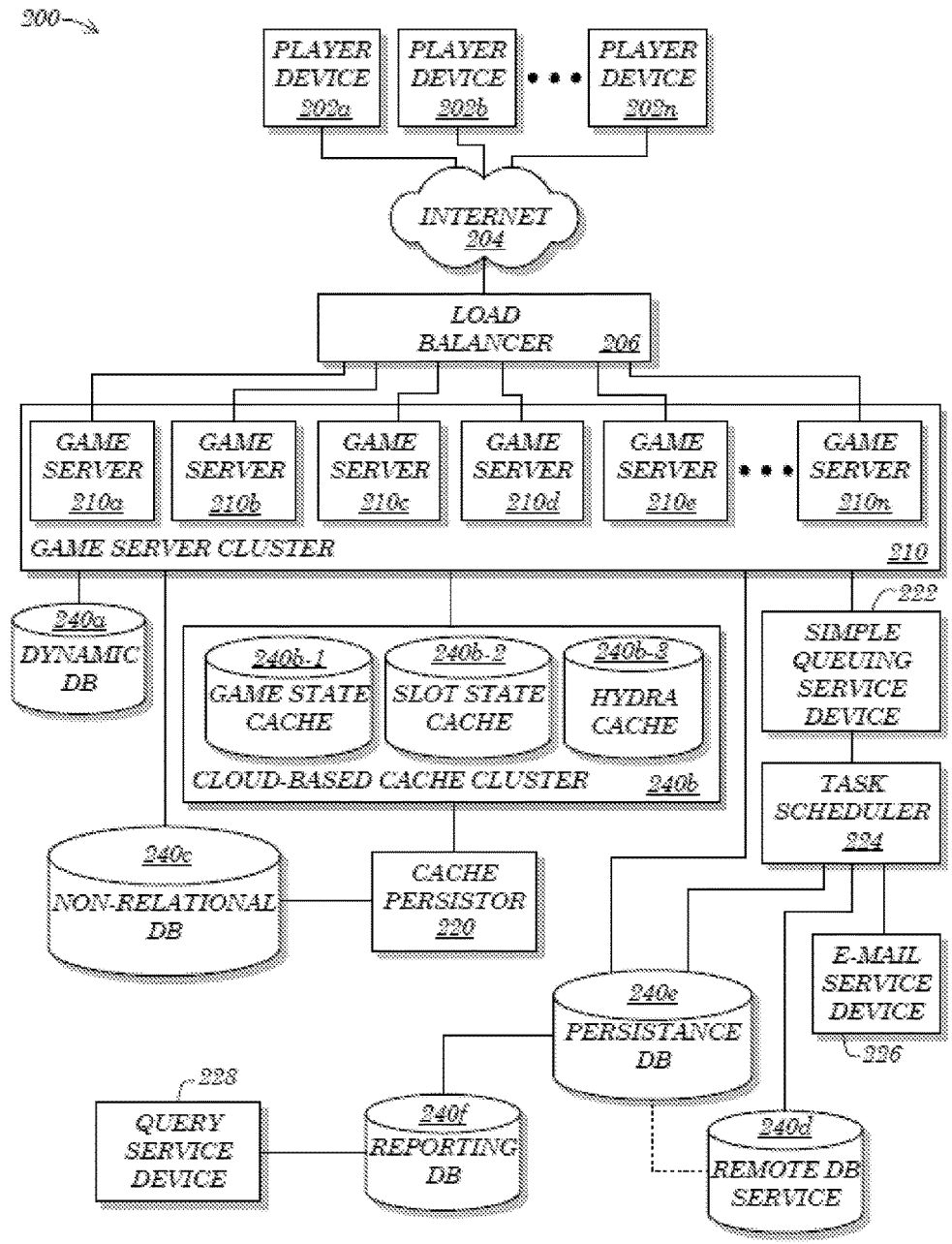
FIG. 2 is a schematic diagram of an embodiment of a distributed computing platform in accordance with one or more embodiments described herein.

Referring now to FIG. 2, a block diagram of a system 200 according to some embodiments is shown. In some embodiments, the system 200 may comprise a gaming platform such as a platform via which social, multiplayer, and/or online games may be played. In some embodiments, the system 200 may comprise a plurality of player devices 202*a-n*, the Internet 204, a load balancer 206, and/or a game server cluster 210. The game server cluster 210 may, in some embodiments, comprise a plurality of game servers 210*a-n*. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202*a-n*, 204, 206, 210*a-n*, 220, 222, 224, 226, 228 may be in communication with and/or coupled to one or more databases 240*a-f*. The system 200 may comprise, for example, a dynamic DataBase (DB) 240*a*, a cloud-based cache cluster 240*b* (e.g., comprising a game state cache 240*b*-1, a slot state cache 240*b*-2, and/or a "hydra" cache 240*b*-3), a non-relational DB 240*c*, a remote DB service 240*d*, a persistence DB 240*e*, and/or a reporting DB 240*f*.

According to some embodiments, any or all of the components 202*a-n*, 204, 206, 210*a-n*, 220, 222, 224, 226, 228, 240*a-f* of the system 200 may be similar in configuration and/or functionality to any similarly named and/or numbered components described herein. Fewer or more components 202*a-n*, 204, 206, 210*a-n*, 220, 222, 224, 226, 228, 240*a-f* (and/or portions thereof) and/or various configurations of the components 202*a-n*, 204, 206, 210*a-n*, 220, 222, 224, 226, 228, 240*a-f* may be included in the system 200 without deviating from the scope of embodiments described herein. While multiple instances of some components 202*a-n*, 210*a-n*, 240*a-f* are depicted and while single instances of other components 204, 206, 220, 222, 224, 226, 228 are depicted, for example, any component 202*a-n*, 204, 206, 210*a-n*, 220, 222, 224, 226, 228, 240*a-f* depicted in the system 200 may comprise a single device, a combination of devices and/or components 202*a-n*, 204, 206, 210*a-n*, 220, 222, 224, 226, 228, 240*a-f*, and/or a plurality of devices, as is or becomes desirable and/or practicable. Similarly, in some embodiments, one or more of the various components 202*a-n*, 204, 206, 210*a-n*, 220, 222, 224, 226, 228, 240*a-f* may not be needed and/or desired in the system 200.

According to some embodiments, the player devices 202*a-n* may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online bingo, slots, poker, and/or other games of chance, skill, and/or combinations thereof. In some embodiments, the various game servers 210*a-n* (virtual and/or physical) of the game server cluster 210 may be configured to provide, manage, host, and/or conduct individual instances and/or sessions of available game types. A first game server 210*a*, for example, may host a first particular session of an online bingo game (or tournament), a second game server 210*c* may host a second particular session of an online bingo game (or tournament), a third game server 210*c* may facilitate an online poker tournament (e.g., and a corresponding plurality of game sessions that comprise the tournament), and/or a fourth game server 210*d* may provide an online slots game (e.g., by hosting one or more slot game sessions).

In some embodiments, the player devices 202*a-n* may comprise various components (hardware, firmware, and/or software; not explicitly shown) that facilitate game play and/or interaction with the game server cluster 210. The player device 202*a-n* may, for example, comprise a gaming client such as a software application programmed in Adobe® Flash® and/or HTML 5 that is configured to send requests to, and receive responses from, one or more of the game servers 210*a-n* of the game server cluster 210. In some embodiments, such an application operating on and/or via the player devices 202*a-n* may be configured in Model-View-Controller (MVC) architecture with a communication manager layer responsible for managing the requests to/responses from the game server cluster 210. In some embodiments, one or more of the game servers 210*a-n* may also or alternatively be configured in a MVC architecture with a communication manager and/or communications management layer (not explicitly shown in FIG. 2). In some embodiments, communications between the player devices 202*a-n* and the game server cluster 210 may be conducted in accordance with the HyperText Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202*a-n* and the game server cluster 210 may be managed and/or facilitated by the load balancer 206. The load balancer 206 may, for example, route communications from player devices 202*a-n* to one or more of the specific game servers 210*a-n* depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/"stickiness"). In some embodiments, the load balancer 206 may comprise one or more devices and/or services provided by a third-party (not separately shown in FIG. 2). The load balancer 206 may, for example, comprise an Elastic Load Balancer (ELB) service provided by Amazon® Web Services, LLC of Seattle, Wash. According to some embodiments, such as in the case that the load balancer 206 comprises the ELB or a similar service, the load balancer 206 may manage, set, determine, define, and/or otherwise influence the number of game servers 210*a-n* within the game server cluster 210. In the case that traffic and/or requests from the player devices 202*a-n* only require the first and second game servers 210*a-b*, for example, all other game servers 210*c-n* may be taken off-line, may not be initiated and/or called, and/or may otherwise not be required and/or utilized in the system 200. As demand increases (and/or if performance, security, and/or other issues cause one or more of the first and second game servers 210*a-b* to experience detrimental issues), the load balancer 206 may call and/or bring online one or more of the other game servers 210*c-n* depicted in FIG. 2. In the case that each game server 210*a-n* comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202*a-n* and the game server cluster 210 are conducted and/or routed. Such proxy servers and/or devices may comprise one or more regional game hosting centers, for example, which may be geographically dispersed and addressable by player devices 202*a-n* in a given geographic proximity. In some embodiments, the proxy servers and/or devices may be located in one or more geographic areas and/or jurisdictions while the game server cluster 210 (and/or certain game servers 210*a-n* and/or groups of game servers 210*a-n* thereof) is located in a separate and/or remote geographic area and/or jurisdiction.

According to some embodiments, for specific game types such as bingo, the game server cluster 210 may provide game results (such as a full set of drawn bingo numbers and/or bonus metrics) to a controller device (not separately shown in FIG. 2) that times the release of game result information to the player devices 202*a-n* such as by utilizing a broadcaster device (also not separately shown in FIG. 2) that transmits the time-released game results to the player devices 202*a-n* (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 210 (and/or one or more of the game servers 210*a-n* thereof) may be in communication with the dynamic DB 240*a*. According to some embodiments, the dynamic DB 240*a* may comprise a dynamically-scalable database service such as the DyanmoDB™ service provided by Amazon® Web Services, LLC. The dynamic DB 240*a* may, for example, store information specific to one or more certain game types (e.g., slots) provided by the game server cluster 210 such as to allow, permit, and/or facilitate reporting and/or analysis of such information.

According to some embodiments, the game server cluster 210 (and/or one or more of the game servers 210*a-n* thereof) may be in communication with the cloud-based cache cluster 240*b*. Game state information from the game server cluster 210 may be stored in the game state cache 240*b-1*, for example, slot state (e.g., slot-game specific state) data may be stored in the slot state cache 240*b-2*, and/or other game and/or player information (e.g., progressive data, referral data, player rankings, audit data) may be stored in the hydra cache 240*b-3*. In some embodiments, the cache persistor 220 may move and/or copy data stored in the cloud-based cache cluster 240*b* to the non-relational DB 240*c*. The non-relational DB 240*c* may, for example, comprise a SimpleDB™ service provided by Amazon® Web Services, LLC. According to some embodiments, the game server cluster 210 may generally access the cloud-based cache cluster 240*b* as-needed to store and/or retrieve game-related information. The data stored in the cloud-based cache cluster 240*b* may generally comprise a subset of the newest or freshest data, while the cache persistior 220 may archive and/or store or move such data to the non-relational DB 240*c* as it ages and/or becomes less relevant (e.g., once a player logs-off, once a game session and/or tournament ends). The game server cluster 210 may, in accordance with some embodiments, have access to the non-relational DB 240*c* as-needed and/or desired. The game servers 210*a-n* may, for example, be initialized with data from the non-relational DB 240*c* and/or may store and/or retrieve low frequency and/or low priority data via the non-relational DB 240*c*.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide mini-game and/or tournament information to the server cluster 210. According to some embodiments, the task scheduler 224 may initiate communications with the SQS device 222, the e-mail service provider 226 (e.g., providing e-mail lists), the remote DB service 240*d* (e.g., providing inserts and/or updates), and/or the persistence DB 240*e* (e.g., providing and/or updating game, player, and/or other reporting data), e.g., in accordance with one or more schedules.

According to some embodiments, the persistence DB 240*e* may comprise a data store of live environment game and/or player data. The game server cluster 210 and/or the task scheduler 224 or SQS device 222 may, for example, store game and/or player data to the persistence DB 240*e* and/or may pull and/or retrieve data from the persistence DB 240*e*, as-needed and/or desired. The server cluster 210 may, according to some embodiments, provide and/or retrieve spin and/or other game event info and/or configuration information via the persistence DB 240*e*.

In some embodiments, the reporting DB 240*f* may be created and/or populated based on the persistence DB 240*e*. On a scheduled and/or other basis, for example, a data transformation and/or mapping program may be utilized to pull data from the live environment (e.g., the persistence DB 240*e*) into the reporting DB 240*f*. The query service 228 may then be utilized, for example, to query the reporting DB 240*f*, without taxing the live environment and/or production system directly accessible by the game server cluster 210.

Figure 3:
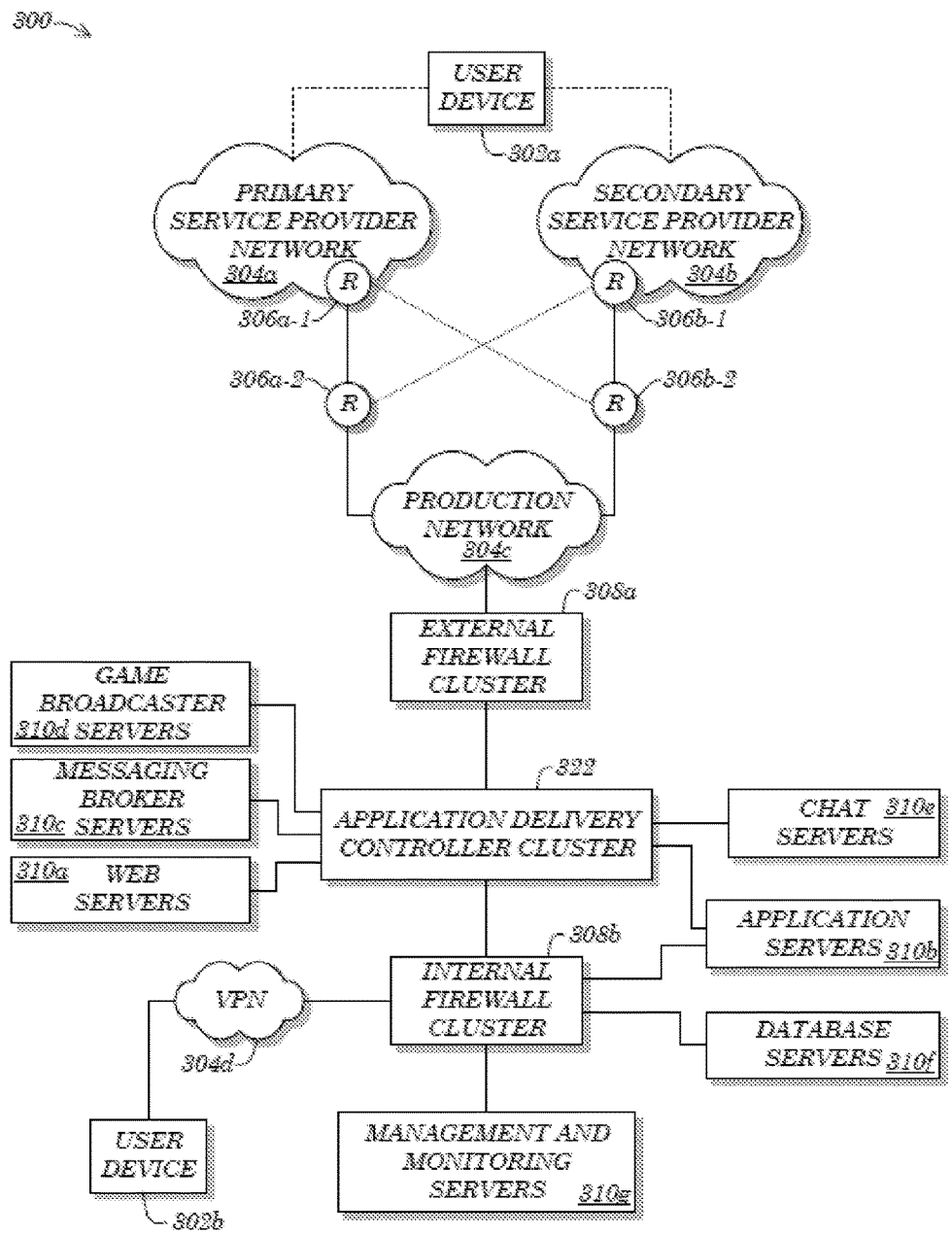
FIG. 3 is a block diagram of an embodiment of a computing device useful in a system according to one or more embodiments described herein.

Turning now to FIG. 3, a block diagram of a system 300 according to some embodiments is shown. In some embodiments, the system 300 may comprise and/or define a "front-end" architecture of a gaming platform such as a platform via which social, multiplayer, and/or online games may be played. In some embodiments, the system 300 may comprise a plurality of user devices 302*a-b*, a plurality of networks 304*a-b* (e.g., a primary service provider network 304*a*, a secondary service provider network 304*b*, a production network 304*c*, and/or a VPN 304*d*), a plurality of routers 306*a-b*, a plurality of firewall devices 308*a-b*, a plurality of game servers 310*a-g* (e.g., web servers 310*a*, application servers 310*b*, messaging broker servers 310*c*, game broadcaster servers 310*d*, chat servers 310*e*, database servers 310*f*, and/or management and monitoring servers 310*g*), and/or an application delivery controller cluster 322.

According to some embodiments, any or all of the components 302*a-b*, 304*a-b*, 306*a-b*, 308*a-b*, 310*a-g*, 322 of the system 300 may be similar in configuration and/or functionality to any similarly named and/or numbered components described herein. Fewer or more components 302*a-b*, 304*a-b*, 306*a-b*, 308*a-b*, 310*a-g*, 322 (and/or portions thereof) and/or various configurations of the components 302*a-b*, 304*a-b*, 306*a-b*, 308*a-b*, 310*a-g*, 322 may be included in the system 300 without deviating from the scope of embodiments described herein. While multiple instances of some components 302*a-b*, 304*a-b*, 306*a-b*, 308*a-b*, 310*a-g* are depicted and while single instances of other components 322 are depicted, for example, any component 302*a-b*, 304*a-b*, 306*a-b*, 308*a-b*, 310*a-g*, 322 depicted in the system 300 may comprise a single device, a combination of devices and/or components 302*a-b*, 304*a-b*, 306*a-b*, 308*a-b*, 310*a-g*, 322, and/or a plurality of devices, as is or becomes desirable and/or practicable. Similarly, in some embodiments, one or more of the various components 302*a-b*, 304*a-b*, 306*a-b*, 308*a-b*, 310*a-g*, 322 may not be needed and/or desired in the system 300.

In some embodiments, a first user device 304*a* may comprise an electronic device owned and/or operated by a player of an online game (not explicitly shown) and/or by an entity that otherwise accesses online game content and/or services externally (e.g., requiring external login and/or access credentials and/or procedures). The first user device 304*a* may, for example, be utilized to access content provided by and/or via the application delivery controller cluster 322. In some embodiments, the first user device 304a may interface with and/or connect to the production network 304c via the primary service provider network 304a and/or the secondary service provider network 304b. The primary service provider network 304a and the secondary service provider network 304b may, for example, load balance and/or provide redundant coverage for outage recovery by utilization of a first primary service provider network router 306a-1, a second primary service provider network router 306a-2, a first secondary service provider network router 306b-1, and/or a second secondary service provider network router 306b-2.

According to some embodiments, the application delivery controller cluster 322 may be insulated and/or protected from the production network 304c by an external firewall cluster 308a. The first user device 304a may, for example, be required to provide credentials to and/or otherwise access the application delivery controller cluster 322 via the external firewall cluster 308a.

In some embodiments, the application delivery controller cluster 322 may receive via and/or from the external firewall cluster 308a and/or the production network 304c, one or more requests, calls, transmissions, and/or commands from the first user device 304a. The first user device 304a may, for example, submit a call for an online gaming interface to the application delivery controller cluster 322. In some embodiments, the application delivery controller cluster 322 may comprise one or more hardware, software, and/or firmware devices and/or modules configured (e.g., specially-programmed) to route events and/or responses between the first user device 304a and one or more of the servers 310a-g. In the case that the first user device 304a is utilized to access an online gaming interface for example, one or more of the web servers 310a (e.g., that may provide graphical and/or rendering elements for an interface and/or other web services) and/or the application servers 310b (e.g., that may provide rule and/or logic-based programming routines, elements, and/or functions—e.g., game play engines) may be called and/or managed by the application delivery controller cluster 322.

In some embodiments, the messaging broker servers 310c may receive and/or retrieve messages from the first user device 304a (and/or from one or more of the other servers 310a-b, 310d-g) and perform one or more inter-application processes in relation thereto. The messaging broker servers 310c may, for example, route, transform, consolidate, aggregate, store, augment, and/or otherwise process one or more requests in connection with provision of online gaming services to the first user device 304a (e.g., facilitating a decoupling of services provided by various applications on and/or from the various servers 310a-b, 310d-g). According to some embodiments, the game broadcaster servers 310d may provide scheduled releases of information descriptive of an online game. The game broadcaster servers 310d may, for example, provide a broadcast feed of bingo numbers, slot and/or other random (and/or pseudo-random) number results that may be accessed by (and/or transmitted to) the first user device 304a (e.g., in connection with the play of an online bingo, slots, and/or other game for which broadcast information may be utilized). In some embodiments, the chat servers 310e may provide, manage, and/or facilitate communications between the first user device 304a (and/or first user thereof) and one or more other player/user devices (such as a second user device 302b and/or other player/user devices not shown in FIG. 3).

According to some embodiments, the second user device 304b may generally comprise an electronic device owned and/or operated by a user (not shown) closely affiliated with an entity that operates the system 300 (such entity also not shown). An employee (e.g., programmer and/or Customer Service Representative (CSR)), contractor, and/or other agent of an online gaming company may, for example, utilize the second user device 304b to interface with the privately-accessible VPN 304d. The VPN 304d may, for example, provide direct access to the application servers 310b, the database servers 310f, the management and monitoring servers 310g, and/or the application delivery controller cluster 322. In some embodiments (as depicted in FIG. 3), such access may be gated through and/or insulated or protected by an internal firewall cluster 308b. The second user device 304b may, for example, be required to provide credentials to and/or otherwise access the application delivery controller cluster 322 and/or servers 310a-g via the internal firewall cluster 308b.

In some embodiments, the database servers 310f may provide access to one or more databases and/or data stores (e.g., not shown in FIG. 3; for data storage and/or retrieval). In some embodiments, the management and monitoring servers 310g may provide services such as monitoring, reporting, troubleshooting, analysis, configuring, etc. to the second user device 304b. The second user device 304b may, for example, access the management and monitoring servers 310g and/or the database servers 310f to run reports descriptive of online gaming operations, game play, and/or game referral setup, management, and/or analysis. According to some embodiments, either or both of the user devices 304a-b in conjunction with one or more of the servers 310a-g and/or the application delivery controller cluster 322 may conduct (in whole or in part), facilitate, and/or otherwise be associated with execution of one or more stored procedures, applications, processes, and/or methods (e.g., the methods described herein below, and/or a portion thereof).

Utilization of the term "server" with respect to the servers 310a-g of the system 300 of FIG. 3 is meant solely to ease description of the configuration and/or functionality of the servers 310a-g. The term "server" is not intended to be limiting with respect to any particular hardware, software, firmware, and/or quantities thereof utilized to implement any or all of the servers 310a-g of the system 300. Similarly, while multiple types and/or instances of the severs 310a-g are depicted in FIG. 3, any or all of the servers 310a-g may be implemented in, on, and/or by one or multiple computer server(s) and/or other electronic devices.

Timer System

A timer system in accordance with some embodiments provides a solution that allows for the dynamic growth or shrinking of the system (e.g., dependent on load) without an impact on the currently running system. This timer system can, in some embodiments, generically be used as a scheduling system implemented within the example systems described above. The timer system has the ability to notify another system or entity at a given time with contextual information given to it at the time of scheduling.

Figure 4:
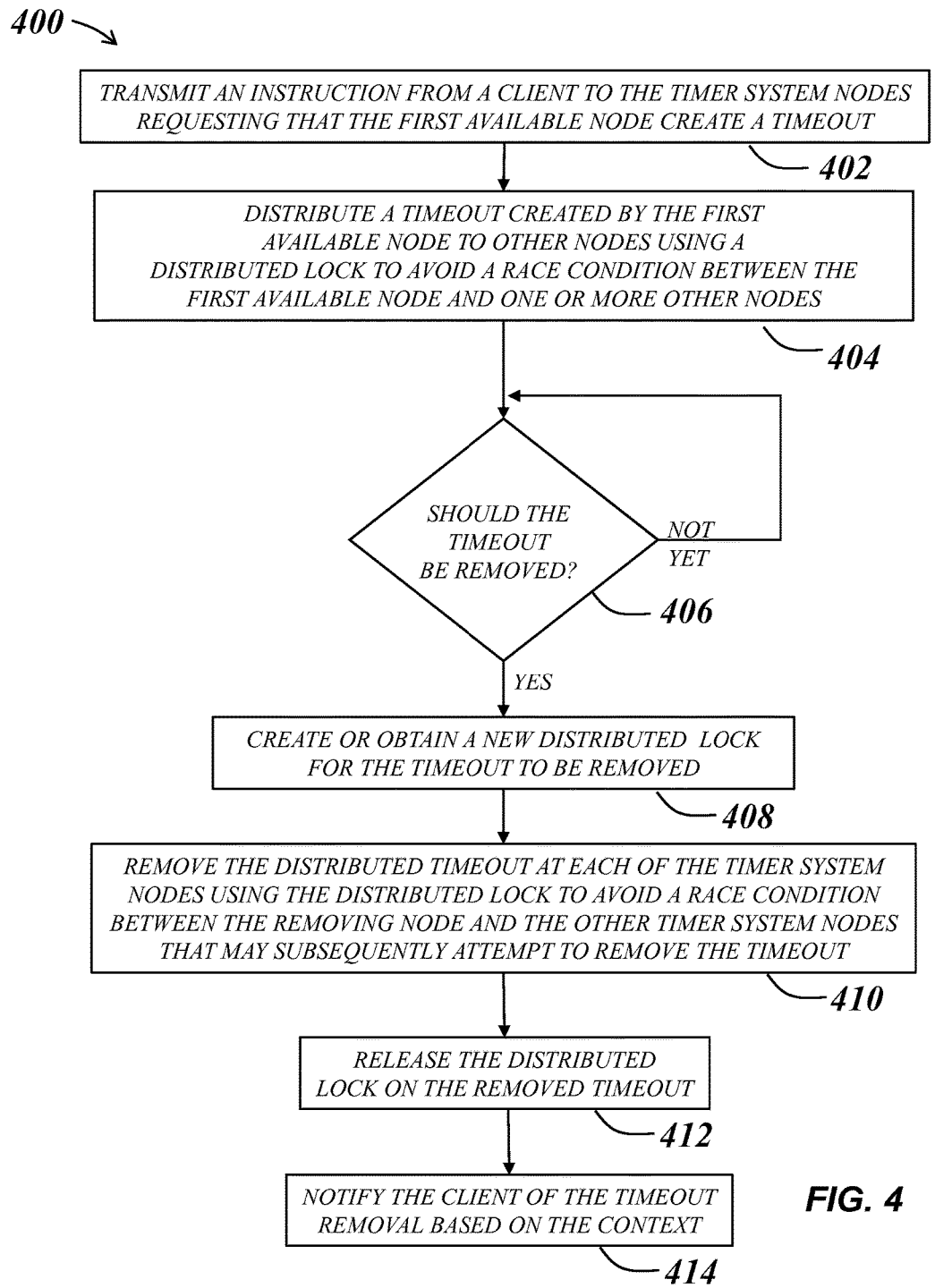
FIG. 4 is a flowchart illustrating an example method of processing a timeout according to one or more embodiments described herein.

Referring to FIG. 4, operation of a timer system in accordance with some embodiments of the invention is illustrated in a flowchart depicting an example method 400. A timer system can be implemented, for example, using a plurality of timer system nodes which can each include an instantiation of a software program executing on one or more game servers 110 or game server clusters 210a-n of FIGS. 1 and 2, respectively. In other embodiments, each timer system node can be implemented using a virtual machine executing on one or more game servers 110 or game server cluster 210a-n or, in another alternative, using a processor or processor core within the game servers 110 or game server cluster 210*a-n*. In any case, the timer system nodes of the present invention are distributed, their numbers can be increased or decreased as desired (e.g., based on load), they can communicate with each other, and they are adapted to execute instructions to implement the example methods depicted in FIGS. 4, 5, 7, and 9.

In some embodiments, the timer system may use the timer system nodes to implement a scheduler for creating, tracking and removing timers related to, for example, an MMO game. A timer may also be referred to as a timeout and include context information indicating a relationship to, for example, a player, an activity, a game instance, client device, an event, etc. Once created, each timeout can either expire on its own (e.g., based on the passage of an amount of time matching the value of the timeout) or be satisfied by an associated external event (e.g., such as a player action in the case of a game). Once expired or satisfied, the system removes the timer and returns the result based on the context information.

As illustrated in the method 400 of FIG. 4, the timer system can send a request to the timer system nodes asking that a first available node create a timeout with an associated context (402). As will be discussed in more detail below, the criteria for qualifying as the "first available node" may be defined by the timer system based on any desired parameters or characteristics of the timeout such as, for example, to insure selection within a deterministic time period and/or to implement load balancing. In the system of the present invention, any node can take any request. Thus, a load balancing server (e.g., a message broker) may receive the request and select the timer node to which the request is ultimately sent. The first available node may be referred to as a primary node since relative to the remaining nodes, it will initiate the scheduling activity. Once the first available node has been determined and receives the request, a distributed lock is obtained or created by the node (404) and sent to one or more secondary nodes. The distributed lock is used to insure that the primary node does not remove the timeout before any of the other nodes that receive the timeout have a chance to store the timeout. In other words, the lock is used to avoid a race condition between the nodes. The lock may be implemented as a software object generated by the timer system or by the primary node. The nodes are each adapted to check to see if a lock exists for a requested timeout before creating the timeout. In some embodiments, the lock may be replicated and distributed to each of the other nodes or to only a small subset of the nodes. Once the distributed lock has been established, replicas of the timeout are distributed (404) to one, some or all of the other nodes to insure the fault tolerance of the system. By using fewer replicas, the amount of bandwidth used is reduced and fewer messages are sent. Thus, in some embodiments, only one replica may be distributed. The lock is released once the timeout has been distributed and thus, the primary node will not remove the timer before the secondary node is ready.

The timer system next waits for either an associated external event to occur within the time value of the timeout that satisfies the timeout or for the timeout to simply expire (406). If either occurs, a new distributed lock is created or obtained for the timeout to be removed (408). This new distributed lock is used to prevent other nodes from reacting to the satisfaction or expiration of the timeout and insures that only the first available node handles the removal of the timeout. Note that the first available node for removing the timeout can be a different node that the first available node for creating the timeout. Once the distributed lock has been established, then each of the replicated timeouts are removed from the other timer system nodes (410). The distributed lock is released once the replicated timeout has been removed from all the other nodes and thus, no other node will attempt to remove the removed timeout (412). The client that originally requested the timeout is then notified of the timeout status using the context information associated with the timeout (414).

Figure 5:
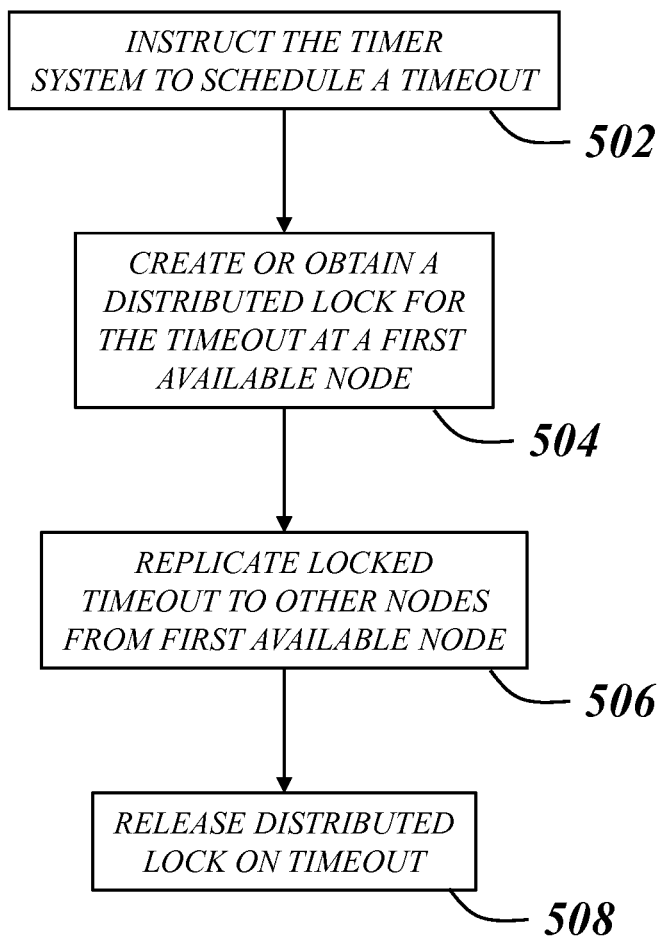
FIG. 5 is a flowchart illustrating an example method of scheduling a timeout according to one or more embodiments described herein.
Figure 6:
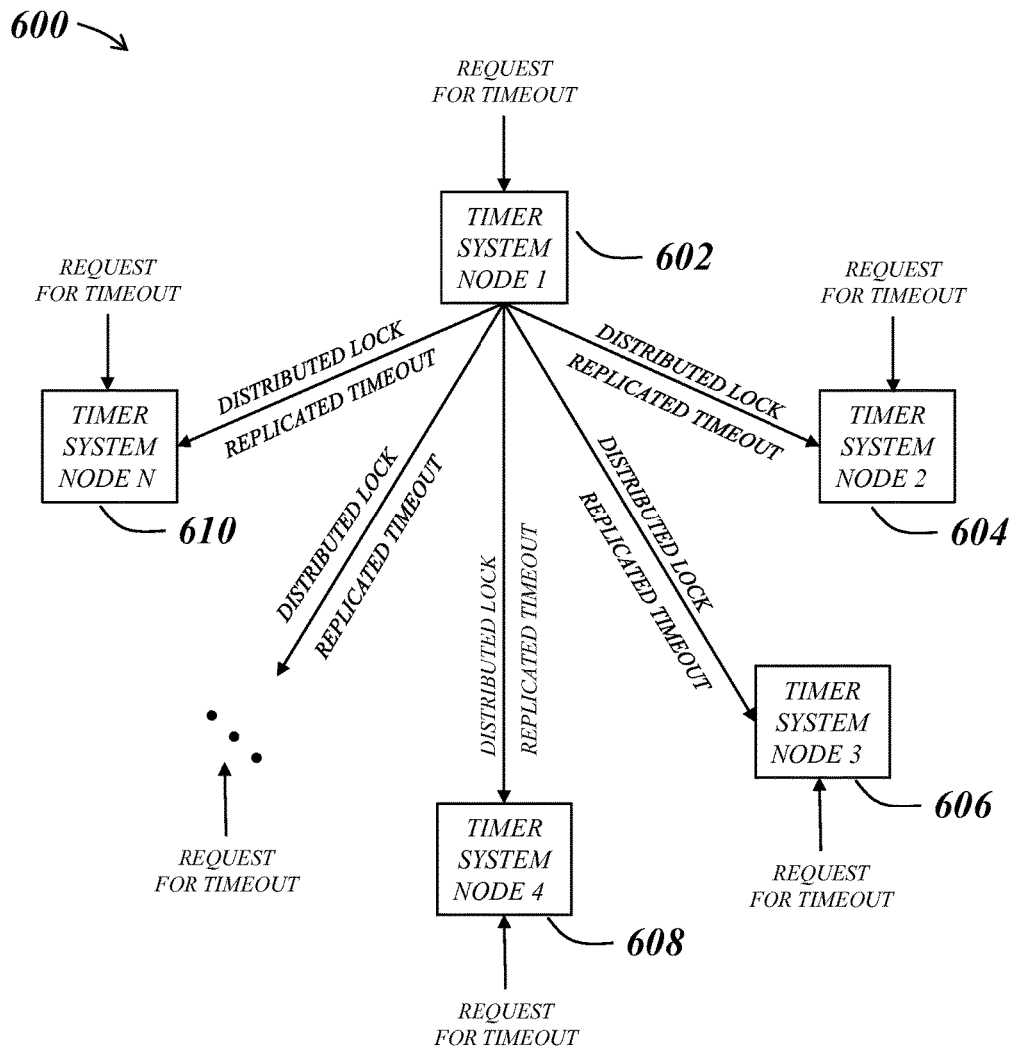
FIG. 6 is a block diagram illustrating an example of the sequence of messaging between timing system nodes in a distributed computing system in accordance with the example method depicted in FIG. 5.

Turning now to FIGS. 5 and 6, the details of initiating and distributing a timeout using a distributed lock are illustrated within an example timer system in accordance with the present invention. FIG. 5 depicts an example method 500 of initiating and distributing a timeout and FIG. 6 depicts an example timer system 600 including timer system nodes 602, 604, 606, 608, 610. Although five nodes are depicted, it should be understood that any practicable number of nodes may be used.

In some embodiments, an instruction to schedule a timeout operation may, for example, be sent and/or provided to a "primary" node such as a first timing system node 602. In some embodiments, the first timing system node 602 may be selected (e.g., from the plurality of available timing system nodes 602, 604, 606, 608, 610) based on characteristics of the timeout, such as in a deterministic manner. Any of the other nodes may be selected. In some embodiments, a "primary" node may be altered and/or switched or load balanced to spread timing ownership and/or workload amongst the available timing system nodes 602, 604, 606, 608, 610. In some embodiments (as depicted in FIGS. 5 and 6), any one of the available nodes may be instructed to schedule a timeout (502) or receive a request for a timeout as indicated by the arrow labeled "Request for Timeout." As indicated above, the first available node (e.g., the first node to respond, the first node to qualify based on predefined criteria, a pre-selected node, etc.) creates or obtains a distributed lock for the timeout (504). In the example of FIG. 6, the "primary" or first timer system node 602 is the selected node. According to some embodiments, the timeout may then be replicated to one or more of the other timer system nodes 604, 606, 608, 610 (506), e.g., to provide redundancy. As represented in FIG. 6, arrows indicating the distribution of the replicated timeout extend from the primary node 602 to each of the other nodes 604, 606, 608, 610. To reduce the amount of messages transmitted and still maintain fault tolerance, in some embodiments, only one secondary node may be used to store a replica of the timer. In some embodiments, the distributed lock may then be released (508).

Figure 7:
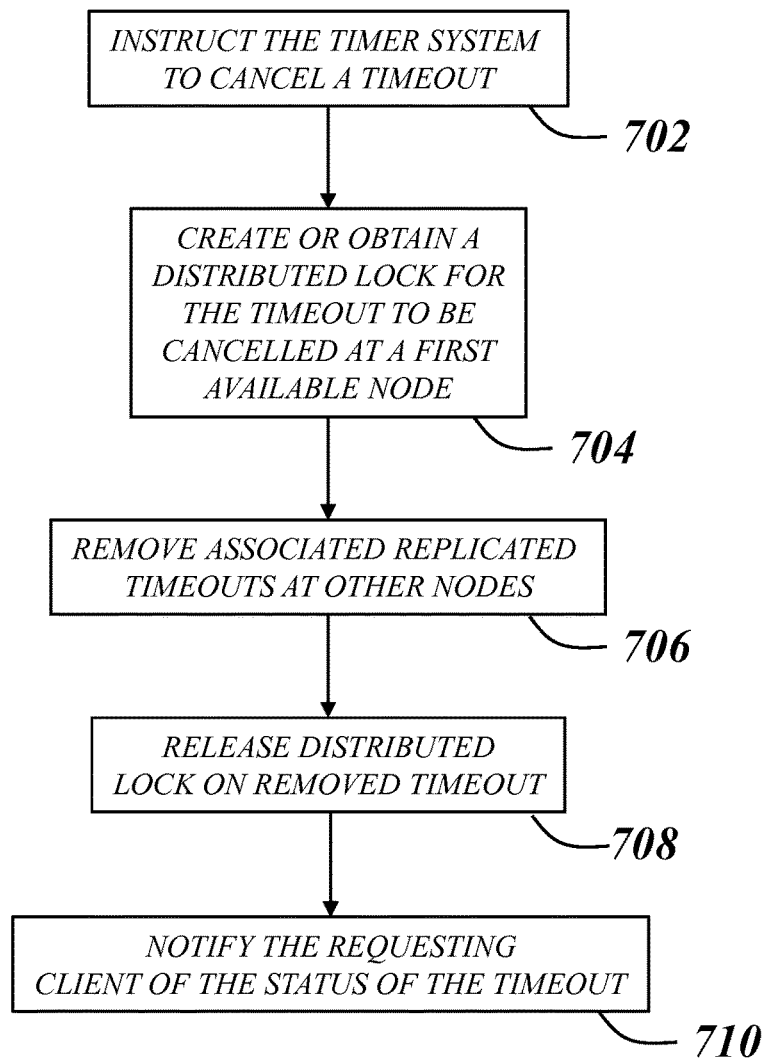
FIG. 7 is a flowchart illustrating an example method of canceling timeouts according to one or more embodiments described herein.
Figure 8:
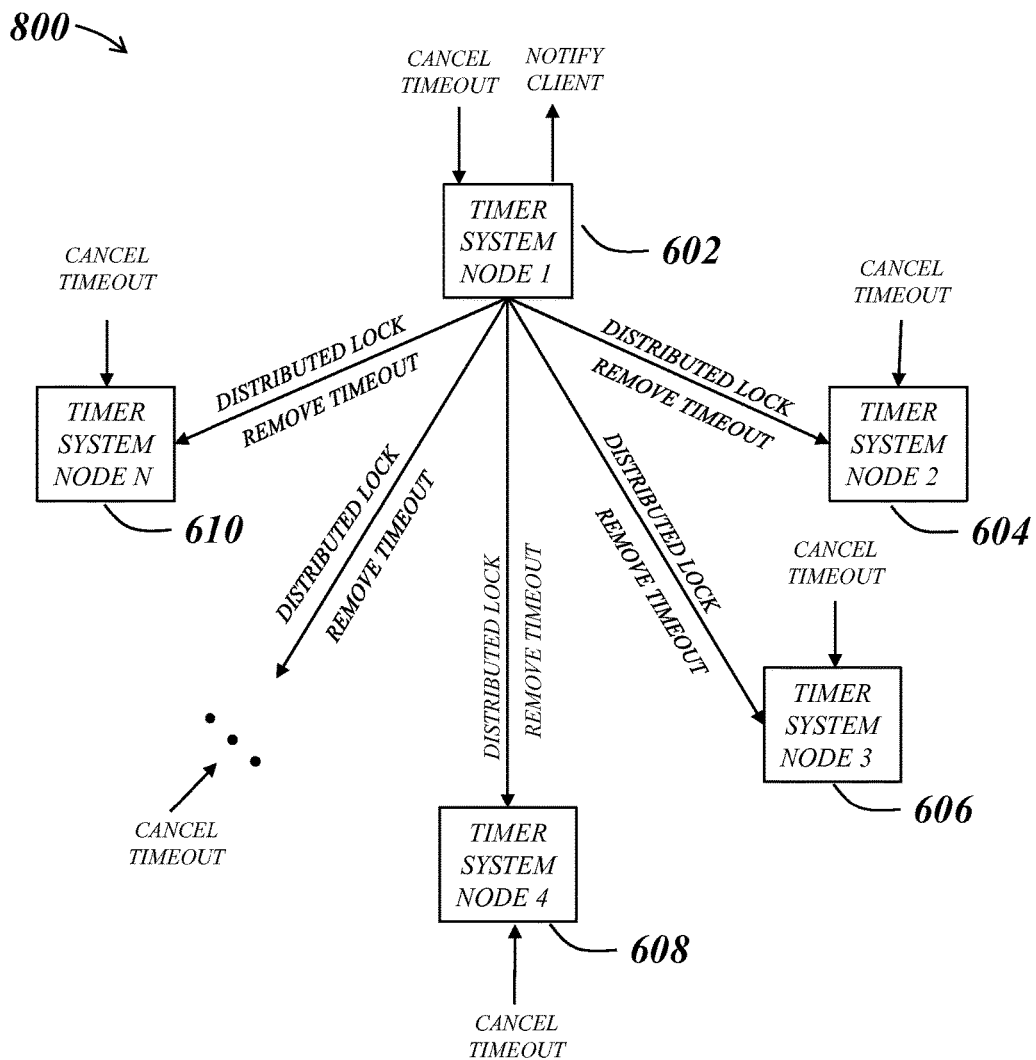
FIG. 8 is a block diagram illustrating an example of the sequence of messaging between timing system nodes in a distributed computing system in accordance with the example method depicted in FIG. 7.

Turning now to FIGS. 7 and 8, the details of canceling a timeout (e.g., due to the timeout being satisfied) are illustrated within an example timer system in accordance with the present invention. FIG. 7 depicts an example method 700 of canceling a timeout and FIG. 8 depicts an example timer system 800 including an indication of example inter-node communication. A client can make a request to the timing system that a timer should be canceled. The request may include context information that allows the timing system to track or identify the timer to be canceled and what client requested the cancellation of the timer. In some embodiments, a cancel timeout operation may, for example, be sent and/or provided to a "primary" node such as a first timing system node 602. In some embodiments, the first timing system node 602 may be selected (e.g., from the plurality of available timing system nodes 602, 604, 606, 608, 610) based on characteristics of the timeout to be canceled, such as in a deterministic manner. Other nodes may be selected.

In some embodiments, a "primary" node may be altered and/or switched or load balanced to spread timing ownership and/or workload amongst the available timing system nodes 602, 604, 606, 608, 610. In some embodiments (as depicted in FIGS. 7 and 8), any one of the available nodes may be instructed to cancel a timeout (702) or receive a request to cancel a timeout as indicated by the arrow labeled "Cancel Timeout." As indicated above, the first available node (e.g., the first node to respond, the first node to qualify based on predefined criteria, a pre-selected node, etc.) creates or obtains a distributed lock for the timeout to be canceled (704).

In the example of FIG. 8, the "primary" or first timer system node 602 is the selected node. According to some embodiments, the timeout may then be removed from the other timer system nodes 604, 606, 608, 610 (706), in response to a message from the primary node 602 to the other nodes 604, 606, 608, 610. As represented in FIG. 8, arrows indicating the message to remove the replicated timeouts extend from the primary node 602 to each of the other nodes 604, 606, 608, 610. In some embodiments, any number of other nodes 604, 606, 608, 610 may have been used to store the replica of the timeout and only those nodes are instructed to remove the timeout. In some embodiments, the distributed lock may then be released (708) and the original requesting client notified of the cancelled timer (710).

Figure 9:
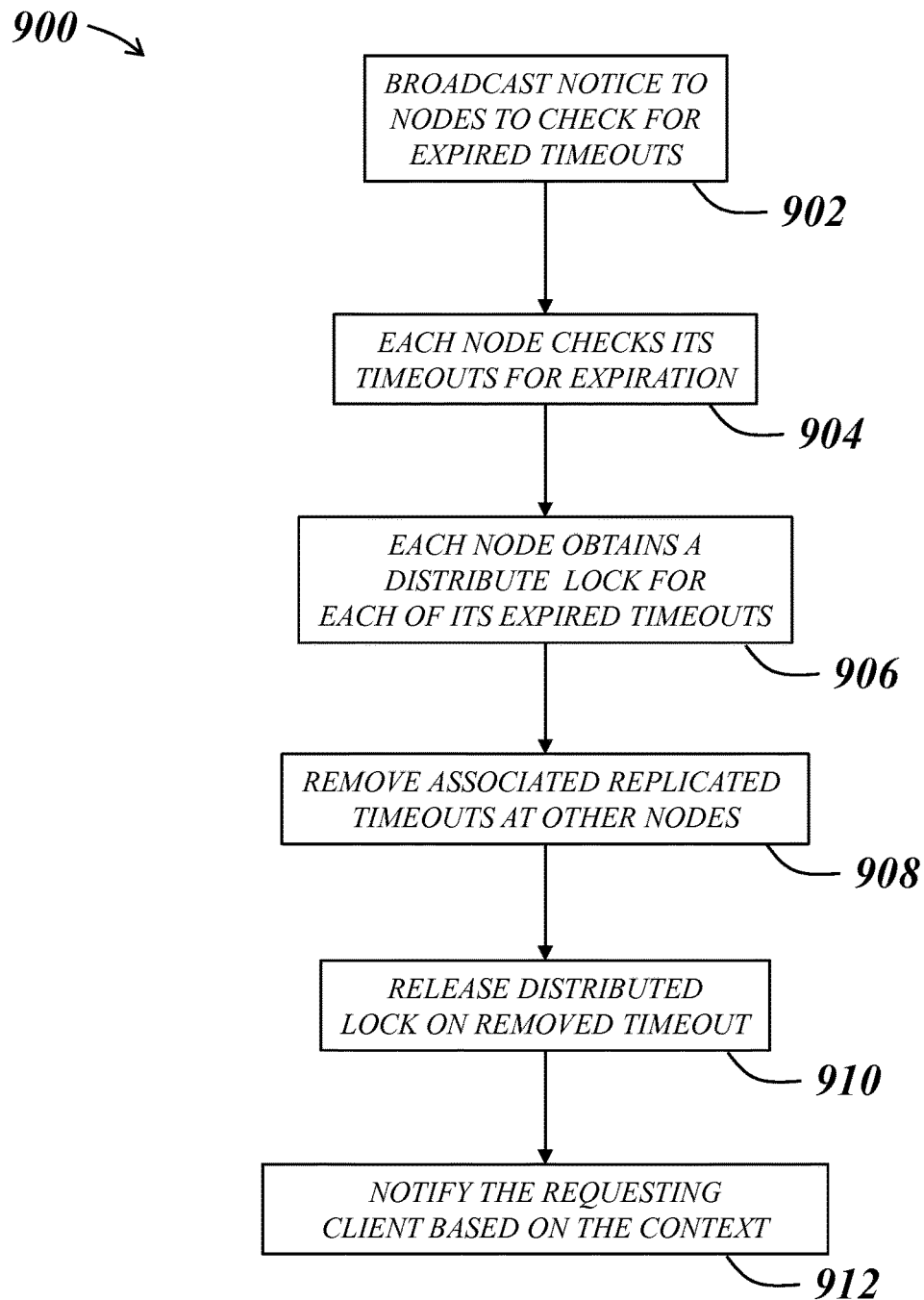
FIG. 9 is a flowchart illustrating an example method of expiring timeouts according to one or more embodiments described herein.
Figure 10:
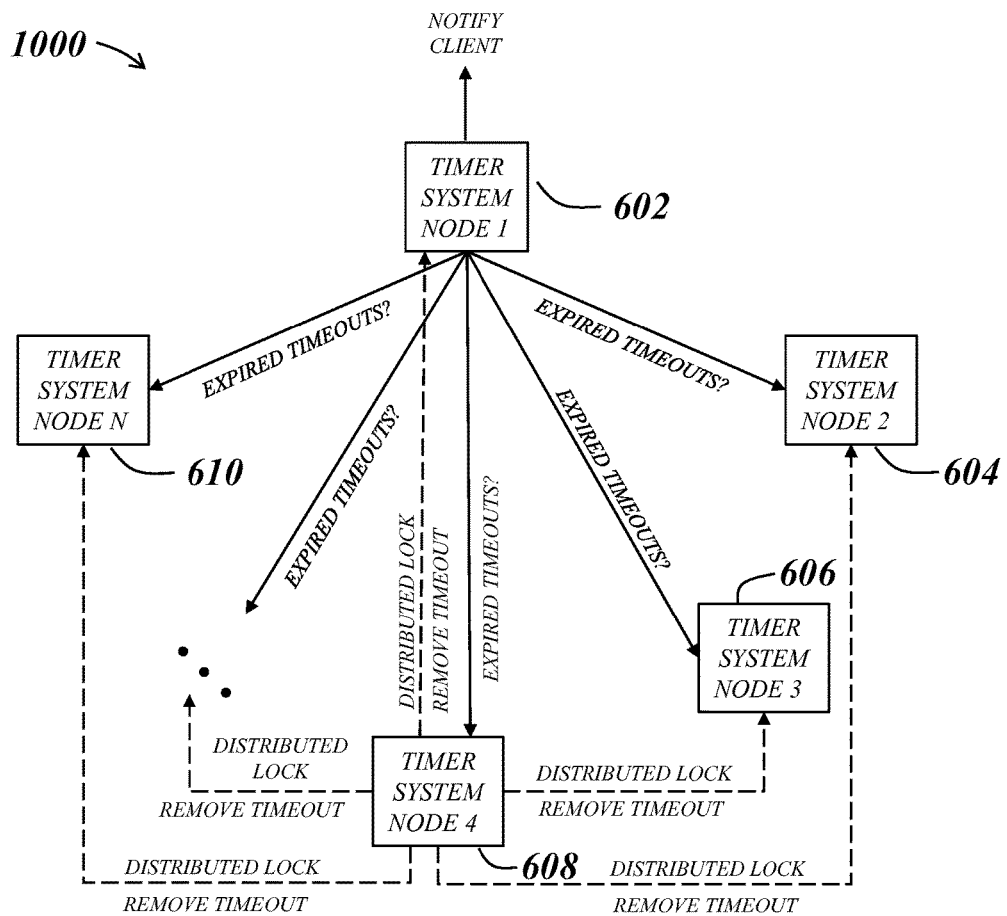
FIG. 10 is a block diagram illustrating an example of the sequence of messaging between timing system nodes in a distributed computing system in accordance with the example method depicted in FIG. 9.

Turning now to FIGS. 9 and 10, the details of expiring a timeout are illustrated within an example timer system in accordance with the present invention. FIG. 9 depicts an example method 900 of expiring a timeout and FIG. 10 depicts an example timer system 1000 including an indication of example inter-node communication.

In some embodiments, an expiring timeout operation may, for example, be sent to, provided to, and/or carried out by a "primary" node such as a first timing system node 602. In some embodiments, the first timing system node 602 may be selected (e.g., from the plurality of available timing system nodes 602, 604, 606, 608, 610) based on characteristics of the timeout to be expired, such as in a deterministic manner. Other nodes may be selected. In some embodiments, a "primary" node may be altered and/or switched or load balanced to spread timing ownership and/or workload amongst the available timing system nodes 602, 604, 606, 608, 610. In some embodiments, all of the available nodes may be instructed to initiate expiring a timeout or receive a request for expiring a timeout. The first available node (e.g., the first node to respond, the first node to qualify based on predefined criteria, a pre-selected node, etc.) broadcasts a notice to the other timer system nodes to each check a respective subset of timeouts to determine if any have expired (902). This broadcast is represented in FIG. 10 by the solid arrows labeled "Expired Timeouts?" and extending from the primary node 602 to each of the other nodes 604, 606, 608, 610. In response, each node checks its respective subset of timeouts assigned to it for expired timeouts (904). In some embodiments, the "primary" or first timing system node 602 also checks for expired timeouts. The "primary" or first timing system node 602 may, for example, check for expired timeouts for which the "primary" or first timing system node 602 was the original, "primary", and/or responsible node.

In the example shown in FIG. 10, the fourth node 608 obtains a distributed lock, thus indicating the presence of an expired timeout. In general, each node with an expired timeout would create or obtain a distributed lock for each expired timeout (906). The lock allows the node attempting to remove expired timeouts to prevent any other node from also attempting to remove the same expired timeout. According to some embodiments, any replicas of the expired timeout may then be removed from any other timing system nodes (908). Removal of the replica timeouts from the other nodes is represented by the dashed arrows in FIG. 10 labeled "Remove Timeout." In some embodiments, the lock may then be released (910) and the original requesting client notified of the cancelled timer using the context (912).

The use of distributed locks when removing satisfied and/or expired timeouts allows the timer system 800, 1000 to guard against a race condition between timer system nodes 602, 604, 608, 610 attempting to remove the same timeout. For example, if the first node 602 determines that a particular timeout has been satisfied and the fourth node 608 determines that the same node has expired, the timer system of the present invention avoids an arbitrary outcome or data inconsistency by determining the outcome based up whichever node gets a lock on the timeout first. This way instead of, for example, network latency being the determining factor whether a player took action within the allotted time, the timer system has the nodes first confirm they can lock the timeout before removing it. Using locks in this manner provides a dynamically scalable, fault tolerant system by avoiding a single point of failure and by allowing any (changing) number of nodes to participate without adding significant overhead.

Figure 11:
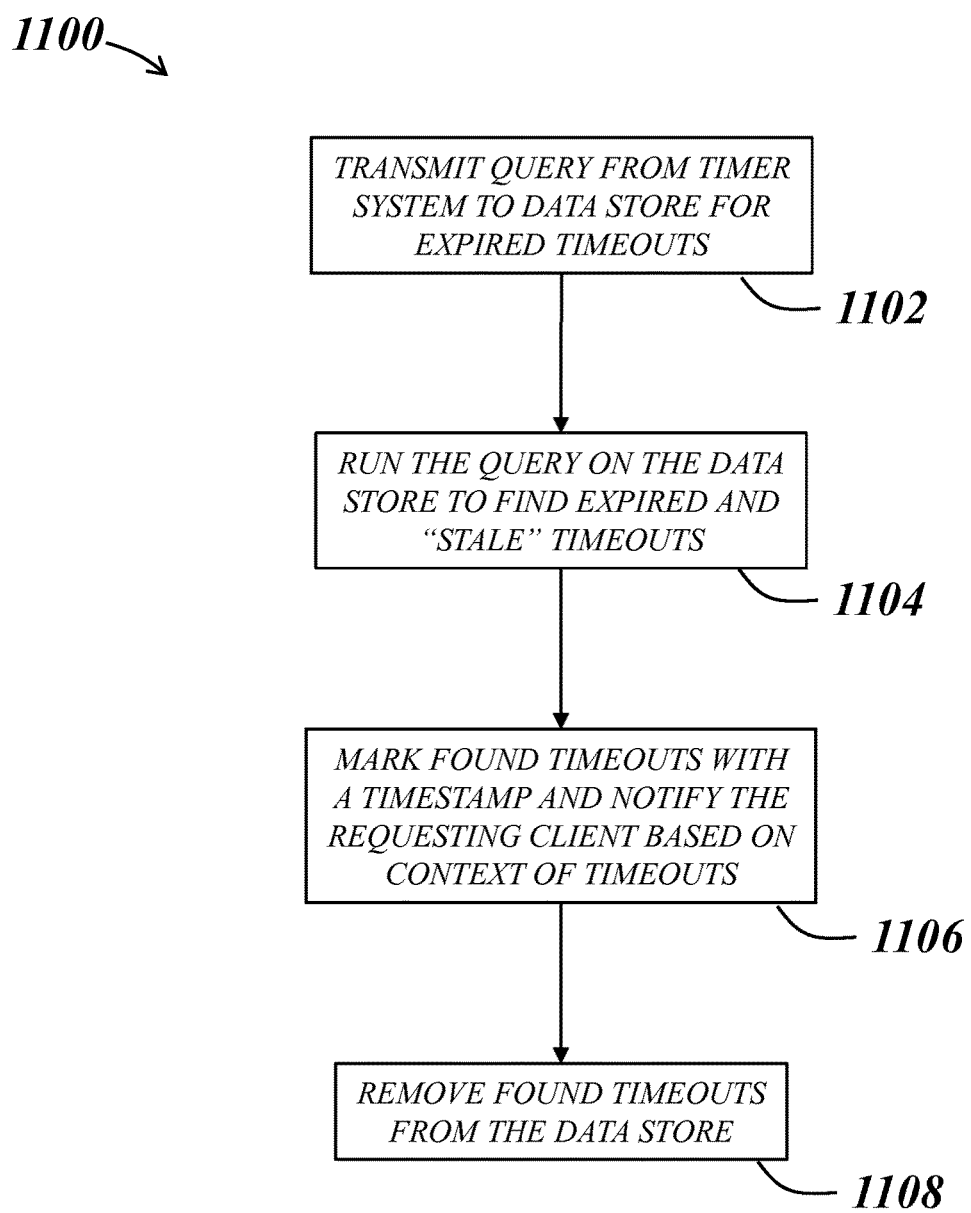
FIG. 11 is a flowchart illustrating an example alternative method of expiring timeouts according to one or more embodiments described herein.
Figure 12:
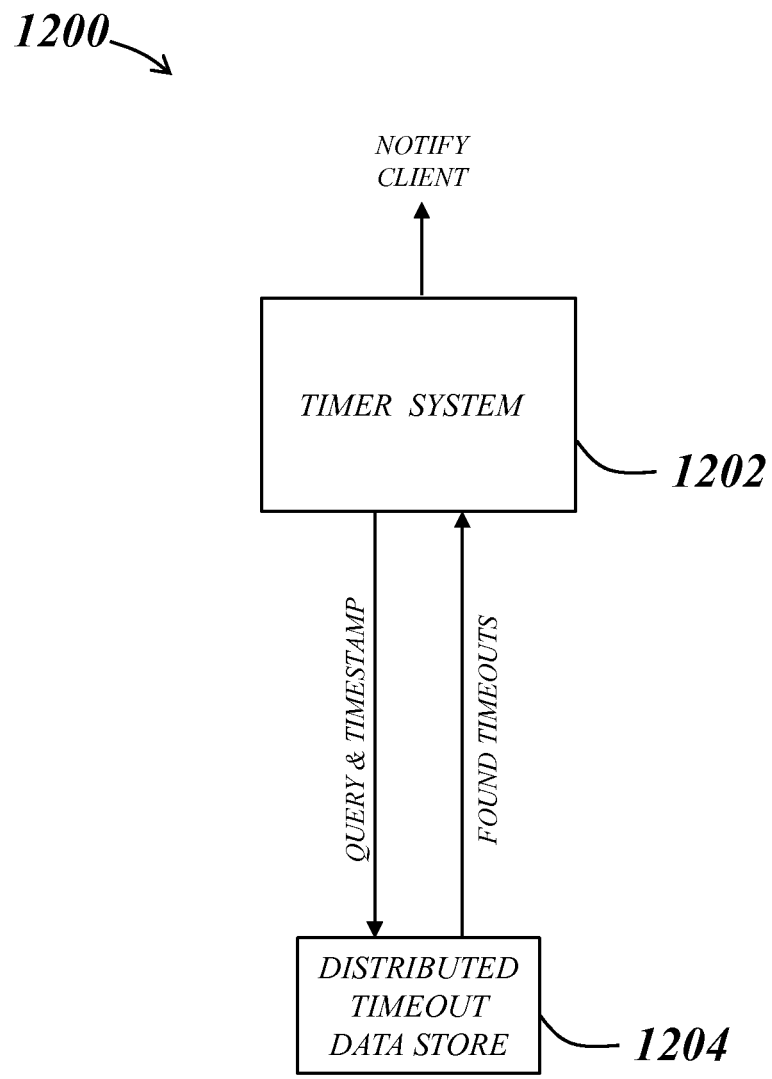
FIG. 12 is a block diagram illustrating an example of the sequence of messaging between a timing system and a distributed timeout data store in a distributed computing system in accordance with the example method depicted in FIG. 11.

Turning now to FIGS. 11 and 12, the details of an alternative method 1100 of expiring timeouts of an example timer system is illustrated in accordance with the present invention. FIG. 11 depicts a flowchart illustrating the example alternative method 1100 of expiring timeouts and FIG. 12 depicts an example system 1200 including an indication of example communication between a timer system 1202 and an external distributed timeout data store 1204.

As mentioned above, in some embodiments of the present invention, instead of storing information regarding timeouts in each of the timer system nodes, an external distributed data store 1204 can be used to hold the information representing the timeouts. The data store 1204 can be implemented using any practicable database (DB) system or arrangement such as, for example, a document-oriented DB, a key-value based DB, a NoSQL based DB, a relational based DB, a hierarchical based DB, a network based DB, etc. An example of a commercially available database suitable for use as a timeout data store for some embodiments of the present invention is the MongoDB document-oriented database provided by MongoDB, Inc. of New York City, N.Y.

Based upon a clock or other trigger, the timer system 1202 can regularly, or as needed, send a query to the distributed timeout data store 1204 that is adapted to identify stored timeouts that are either expired or "stale" (1102). A stale timeout can be defined as a timeout in the data store 1204 that has not been accessed (e.g., acted upon, expired, etc.) within a predefined amount of time or a pre-set number of query cycles. The query from the timer system 1202 is run against the timeout data store 1204 to find expired timeouts and timeouts that qualify as stale based upon a predefined criteria, e.g., older than a predefined age (1104).

Timeouts that are identified or found by the query are marked with a timestamp and the client that originally requested the timer is notified of the expired status (1106). In some embodiments, running the query and marking the expired/stale timeouts with timestamps can be performed in a single atomic operation within the data store 1204. Once the expired timeouts have been processed (e.g., the requesting clients have been notified of the timeouts' status), the timeouts are removed from the data store 1204 (1108).

In some embodiments, the external distributed data store 1204 can be implemented with redundancy to avoid creating a single point of failure. Further, by externalizing storage of the timeouts, systems using embodiments of the present invention may realize some efficiencies by better utilization of storage space, improved data maintenance, and faster problem resolution as a result of more modularity and better separation of concerns since the timer system nodes do not store the timeouts.

Rules of Interpretation

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "and/or", when such term is used to modify a list of things or possibilities (such as an enumerated list of possibilities) means that any combination of one or more of the things or possibilities is intended, such that while in some embodiments any single one of the things or possibilities may be sufficient in other embodiments two or more (or even each of) the things or possibilities in the list may be preferred, unless expressly specified otherwise. Thus for example, a list of "a, b and/or c" means that any of the following interpretations would be appropriate: (i) each of "a", "b" and "c"; (ii) "a" and "b"; (iii) "a" and "c"; (iv) "b" and "c"; (v) only "a"; (vi) only "b"; and (vii) only "c."

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component or article is described herein, more than one device, component or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component or article is described herein (whether or not they cooperate), a single device, component or article may alternatively be used in place of the more than one device, component or article that is described. For example, a plurality of computer-based devices may be substituted with a single computer-based device. Accordingly, the various functionality that is described as being possessed by more than one device, component or article may alternatively be possessed by a single device, component or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure may refer to a "control system" or program. A control system or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

What is claimed is:

1. A method of providing fault-tolerant, elastically scalable timers utilizing distributed timer system nodes, by expiring a timer having contextual information and established in response to a request from a client device, comprising:
   broadcasting, by a primary node and to a plurality of secondary nodes, a notice to check for expired timers;
   identifying, by at least a first one of the secondary nodes and in response to the broadcasting, an expired timer;
   establishing, by the at least first one of the secondary nodes, a distributed lock for the expired timer;
   removing, by the at least first one of the secondary nodes and from at least a second one of the secondary nodes, the expired timer associated with the distributed lock;
   releasing, by the at least first one of the secondary nodes, the distributed lock on the expired timer; and
   notifying, utilizing the contextual information of the expired timer, the client device of the expiration of the expired timer.

2. The method of claim 1, wherein the broadcasting of the notice to check for the expired timer to the plurality of secondary nodes includes sending a message to each of the secondary nodes.

3. The method of claim 1, wherein establishing the distributed lock for the expired timer includes creating or obtaining the distributed lock.

4. The method of claim 1, wherein the at least first one of the secondary nodes comprises a plurality of the nodes from the plurality of secondary nodes.

5. The method of claim 1, wherein the plurality of secondary nodes are adapted to verify that the expired timers do not have an existing lock before attempting to remove the expired timer.

6. The method of claim 1 wherein the broadcasting is further conducted by one or more of the secondary nodes.

* * * * *